June 12, 1951 — G. J. PIEROTTI ET AL — 2,556,213

SEPARATION OF NONNEUTRAL ELECTROLYTES

Filed July 26, 1949

Inventors: Gino J. Pierotti
Frederic A. French
Mott Souders, Jr.
By Oswald H. Milmore
Their Attorney Patented June 12, 1951

2,556,213

UNITED STATES PATENT OFFICE 2,556,213

SEPARATION OF NONNEUTRAL ELECTROLYTES

Gino J. Pierotti, Albany, Frederic A. French, Berkeley, and Mott Souders, Jr., Piedmont, Calif., assignors to Shell Development Company, San Francisco, Calif., a corporation of Delaware Application July 26, 1949, Serial No. 106,776

25 Claims. (Cl. 260—302)

This invention relates to the separation of mixtures of organic electrolytes having a tendency to change their number of protons in the same direction when dissolved in an ionizing medium, but having different dissociation constants, i. e., mixtures containing several organic acids or several organic bases of different dissociation constants. Such substances are, for convenience, herein referred to as non-neutral organic electrolytes. The invention deals particularly with a solvent extraction method which permits a fractionation of such mixtures according to the strengths of such non-neutral organic electrolytes.

Mixtures of various organic acids or organic bases of different strengths are frequently obtained in various industries, and often it is desired to separate from them one or several particular components. Frequently the solubilities in various solvents of different members of such mixtures are of the same or similar magnitudes, and as a result they are very difficult to separate by solvents. Such mixtures may include fatty acids, acids obtained by the oxidation of hydrocarbon mixtures, halogenated fatty acids, phenols and thiophenols, mercaptans, acids resulting from certain fermentation process, particularly those obtained in the manufacture of penicillin, amino acids obtained from proteins, fruit and vegetable juices containing various acids, certain inorganic bases obtained in the ammonolysis of chlorinated hydrocarbons, petroleum bases, coal tar bases, alkaloids, etc. Such mixtures may contain two or more acidic or basic components, and often are exceedingly complex.

It is a purpose of this invention to separate mixtures of non-neutral organic electrolytes by solvent extraction according to the strengths of their constituents, i. e., their dissociation constants, and to achieve this more effectively and completely than has been possible heretofore. Another purpose is to separate members of such mixtures having similar solubilities in solvents but different dissociation constants, by solvent extraction. A more specific purpose is to separate water-soluble organic acids or bases from their mixtures in dilute aqueous solutions. Still another purpose is to control the separation so that an effective fractionation is achieved between the components of such mixtures having but small differences in their dissociation constants.

In the solvent extraction method to be described the feed mixture of organic, non-neutral electrolytes is extracted simultaneously by two extraction liquids which are at least partially immiscible with one another so as to form simultaneous liquid phases. These liquids are both solvents for the organic electrolytes but differ in their effects on the ionization of the electrolytes dissolved therein: One of the extraction liquids, herein for convenience called the ionizing medium, is a highly polar, at least partially water-miscible liquid, such as anhydrous ammonia, a lower aliphatic alcohol or water itself, having the property of causing the organic electrolyte dissolved therein to ionize. The other extraction liquid, herein for convenience called the extraction solvent, is a less polar or non-polar organic liquid, such as a hydrocarbon or a higher aliphatic alcohol, ketone or ester, which causes relatively little or no ionization of the organic electrolyte which is dissolved therein.

The two extraction liquids are introduced at spaced points into a countercurrent extraction zone, which may comprise a series of mixers and settlers or a column with perforated plates, trays, packing materials or other contact means, etc., and flowed countercurrently therein. The feed mixture is introduced into the extraction zone at any suitable point downstream (in the direction of flow of the extraction solvent) from the point of introduction of the extraction solvent, e. g., at a point intermediate the points of introduction of the two extraction liquids, or together with the ionizing medium; it may be introduced either separately or dissolved in the ionizing medium or in an inert vehicle or in a part of the extraction solvent. When the feed mixture is brought into contact with the extraction liquids its constituent organic electrolytes dissolve in part in each of the extraction liquids, forming two solutions or liquid phases; the phase which is rich in the ionizing medium is herein for convenience called the raffinate phase, while the phase which is rich in the extraction solvent is called the solvent extract phase. Each electrolyte will be dissolved in the two phases in accordance with a definite distribution, known as a distribution constant $K$, which is numerically equal to the ratio of the concentration of the electrolyte in the solvent extract phase to the concentration of the electrolyte in the raffinate phase. This distribution constant depends in part upon the degree of ionization of the electrolyte, in the sense that when the electrolyte is more highly ionized the distribution constant K is lowered; in other words, ionized electrolyte tends to be rejected from the extraction solvent and be dissolved in the ionizing medium, while electrolyte which is in its free or unionized state tends to be rejected by the ionizing medium and to be dissolved in the extraction solvent. The extent of ionization of the electrolyte is determined by the ionization constant of the electrolyte and by the pH in the ionizing medium.

It is desired to effect the separation of the feed mixture by concentrating the organic electrolyte with the lowest dissociation constant, i. e., the weakest acid or base, in one of the two phases (usually in the solvent extract phase) and the organic electrolyte with the highest dissociation constant in the other phase. (When the alpha value, described hereinafter, is smaller than 1, the weaker acid or base is concentrated in the raffinate phase and the stronger acid or base is concentrated in the solvent extract phase.) The distribution of the acids and bases between the two phases is evidently to a great extent determined by the pH of the raffinate phase.

Now the present invention is founded upon the discovery that the pH gradient between the points of introduction of the feed mixture of organic electrolytes and the extraction solvent which results naturally from such a countercurrent extraction is highly unfavorable for bringing about the desired concentrations of the constituents; and that the effectiveness of the extraction can be improved by altering the pH gradient. This alteration in the pH gradient is effected according to the invention by the injection of a stripping electrolyte having the same tendency to change protons as the organic electrolytes of the feed mixture which is stronger than the organic electrolytes being separated, into the extraction zone at one or more points downstream (in the direction of flow of the raffinate phase) from the point of introduction of the feed mixture. Stated in another way, a stronger acid is injected as the stripping electrolyte when a mixture of organic acids is being treated, and a stronger base is injected when a mixture of organic bases is being treated. This injection reduces or eliminates the unfavorable pH gradient, or may even reverse the naturally occurring pH gradient, resulting, in any event, in a more favorable pH gradient. The invention, therefore, resides in altering the naturally occurring pH gradient. The reasons therefor and the specific ways of effecting this alteration in the pH gradient will be described in detail hereinafter.

The invention will be described in greater detail with reference to the accompanying drawing forming a part of this specification, wherein.

The mixtures to be separated comprise organic acidic or basic electrolytes A and B, the component A being throughout the description of this specification assumed to be the stronger electrolyte. Both A and B may be mixtures of different individual acids or bases.

As was previously indicated, in the process to be described the feed mixture to be separated is treated countercurrently in an extraction zone with two extraction liquids which under the conditions of the treatment are at least partially immiscible, viz., an organic extraction solvent and an ionizing medium, both of which are solvents for the components A and B. The feed mixture and ionizing medium are introduced into the extraction zone at the same or different points distant from the point at which the extraction solvent is introduced so as to flow countercurrently to the extraction solvent. At one or several points of said extraction zone away from the feed mixture inlet, preferably at the first equilibrium stage with the fresh extraction solvent (in the direction of flow of the solvent), a relatively strong acid or base is admitted, an acid being used if the feed is acidic, and a base if the feed is basic. This acid or base, herein called the "stripping" electrolyte, must be stronger than the acid or base B of the feed mixture, and it must be soluble in the ionizing medium and have a low distribution constant between the solvent and the ionizing medium, i. e., lower than 1 and, preferably, lower than about 0.1.

The solvent extract phase and the raffinate (ionizing medium-rich) phase are separately withdrawn from the extraction zone at the ends opposite the solvent inlet and the feed inlet, respectively, and the concentrated components A and B are separated therefrom by known means, such as distillation. If desired, a scrubbing zone may be superimposed onto the extraction zone wherein the solvent extract phase is scrubbed with an ionizing medium in one or in several countercurrent stages. This ionizing medium may be the same as that which was used in the extraction, or a different liquid. As a result, there is obtained a scrubbed extract phase from which some of the impurities are removed, whereby the preferentially dissolved component is more highly concentrated therein; there is also produced an enriched ionizing medium containing a portion of the feed mixture which was scrubbed from the solvent extract phase. This rich ionizing medium and the scrubbed extract are separated and the former is then introduced into the extraction zone. When the ionizing medium used in the scrubbing zone is the same as that used in the extraction zone it is possible to feed two streams of the same ionizing medium into the system, viz., one into the end of the extraction zone and the other into the scrubbing zone, these two streams being combined in the extraction zone. It is, however, also possible to feed all of the ionizing medium initially into the scrubbing zone.

It is often desirable that the ionizing medium contain buffer substances which give it buffering capacity in the extraction zone, as well as in the scrubbing zone if a scrubbing zone is employed.

Inasmuch as the following detailed description involves a number of physical and chemical concepts, a series of definitions are given below which will be helpful in considering the specification:

As was stated above, the invention is generally applicable to acids or bases because acids and bases are both electrolytes which have a tendency to change their number of protons, acids tending to lose and bases to acquire protons (Bell, "Acid-Base Catalysis," pp. 39 and 41, Oxford Press, 1941). The concept of acids and bases also includes non-neutral salts. Thus, in accordance with this concept which is generally accepted in the art, "An acid is a species having a tendency to lose a proton" (Bell, page 39), and "A base is a species having a tendency to add a proton" (Bell, page 41). These definitions of acid and base species can be summed up in the scheme $$A \rightleftharpoons B + H^+$$

where A is an acid and B a base. Two species related in this way are known as a corresponding (or conjugate) acid-base pair: such pairs are $CH_3COOH$ and $CH_3COO^-$, $NH_4^+$ and $NH_3$, $H_2PO^-_4$ and $HPO^=_4$, etc. (Bell, pp. 42–43.) Since aqueous solutions of acidic or basic substances containing equilibrium mixtures of the acid and base species of conjugate acid-base pairs the term conjugate acid-base pair is generic to the two species, acids and bases, the difference between acids and bases being largely one of degree rather than of kind; it follows that the terms acids and bases are relative and not absolute. As an illustration, the conjugate acid-base pair $$CH_3COOH\text{---}CH_3COO^-$$

interacts with the conjugate acid-base pair $HCl\text{---}Cl^-$ to transform $CH_3COO^-$ to $CH_3COOH$ and $HCl$ to $Cl^-$, whereas the pair $$CH_3COOH\text{---}CH_3COO^-$$

interacts with the conjugate acid-base pair $NH_4^+\text{---}NH_3$ to transform $CH_3COOH$ to $CH_3COO^-$ and $NH_3$ to $NH_4^+$. In simple language, hydrogen chloride is more acidic than (acidic to) acetic acid, and conversely acetic acid is basic with respect to hydrogen chloride, whereas acetic acid is acidic with respect to ammonia. In other words, the action of acetic acid relative to hydrogen chloride is of the same character in type as the action of ammonia relative to acidic acid.

Buffer substances are acids, bases or salts having finite, and especially small, dissociation constants such that their dissociation equilibrium opposes a change of pH. Substances of different pK values are required in order that they may act as buffers in different pH regions. (pK value is the pH at which the dissociation of the electrolyte is 50%.) For example, $NaH_2PO_4$ is a buffer in the pH region of 5 to 8. In other pH regions other buffers may be used. Thus buffers in general cover a wide range of electrolytes from strongly acidic to strongly basic. In most instances, they are salts of a strong base with a weak acid or of a strong acid with a weak base.

Ionizing media other than water used in the extraction and for scrubbing are polar liquids having the property of causing ionization of electrolytes dissolved in them. They are usually characterized by a high di-electric strength. They should be at least partially soluble in water (say at least 25%) and preferably miscible therewith in all proportions.

Examples of ionizing media are water (either pure or containing a solute, such as a buffer or one of the other ionizing media listed), liquid anhydrous ammonia, anhydrous liquid $SO_2$, liquid $CO_2$, water-soluble mono and polyhydric alcohols such as methyl alcohol, ethyl alcohol, isopropyl alcohol, ethylchlorhydrin, ethylene glycol, propylene glycol, butylene gylcol, diethylene glycol, triethylene glycol, higher polyethylene glycols, corresponding polypropylene, butylene, etc. glycols, glycerine, methyl glycerine, ethyl ether of glycerine, etc.; acetone diacetone alcohol; esters of low fatty acids with water soluble alcohols such as methyl formate, ethyl formate, methyl acetate, ethyl acetate; amines such as ethyl amine, dimethyl amine, propyl amine, ethylene diamine, mono-, di-, and triethanolamines, propanolamines, aminopropane diols, diamino propanols, pyrazine, pyridine, urea; ethers such as dioxane, morpholine; lower fatty acids such as formic acid, acetic acid, lactic acid; amides such as formamide, acetamide, N-methylformamide; nitriles such as acetonitrile, propionitrile, lactonitrile; sulfones such as dimethyl sulfone, diethyl sulfones, sulfolane, diethyl sulfolane, etc.

Solvents useful in the extraction are organic, at least partially water-immiscible liquids capable of dissolving the feed mixture to be separated and which are at least partially immiscible with the ionizing medium under the conditions of the extraction. As a rule, suitable solvents are substantially neutral and are little if at all water-soluble, their solubility in water being in general less than about 25% at normal room temperature.

Examples of solvents are various hydrocarbon liquids or mixtures thereof, such as propane, butanes, pentanes, hexanes, heptanes, octanes, benzene, toluene, xylenes, cumene, tetralene; gasoline, naphthas, kerosene; chlorinated hydrocarbons such as methyl chloride, chloroform, carbon tetrachloride, ethyl chloride, ethylene dichloride, trichlorethylene, tetrachlorethane, propyl chloride; alcohols of 4 and more carbon atoms such as n-butyl alcohols, amyl alcohols, hexyl, etc. alcohols; esters having 5 or more carbon atoms of monohydric alcohols with fatty acids such as methyl butyrate, methyl valerate, methyl caproate, ethyl proprionate, ethyl butyrate, ethyl valerate, propyl acetate, propyl propionate, propyl butyrate, propyl valerate, butyl, amyl, etc., formates, acetates and higher esters; aliphatic ketones of 4 or more carbon atoms as methyl ethyl ketone, diethyl ketone, methyl isopropyl ketone, diisopropyl ketone, methyl isobutyl ketone, diisobutyl ketone; ethers, amines, imines, etc. which are substantially water-insoluble; alkyl phenols, etc.

In choosing individual members of the classes of ionizing media and solvents for use in a given extraction, sight must not be lost of the fact that they must meet several conditions, namely be relatively immiscible with each other and be inert towards each other, as well as towards the feed and the stripping acid or base injected into the extraction zone. The solvent power of the ionizing medium for the stripping acid or base must be better than that of the extraction solvent. Thus, it is understood that not all combinations are operative. However, a few simple tests will direct any one skilled in the art to choose the proper combination. The invention is not restricted to the use of any specific solvent or ionizing medium and does not reside in the particular substances herein enumerated by way of example, but resides in the improvement of any separation by the technique of controlling the pH, as described elsewhere in this specification. Solubility relations can frequently be modified by combining two or more ionizing media or solvents. For example, assuming a system be employed wherein the ionizing medium is a lower alcohol and the solvent a hydrocarbon oil, the addition of some water, glycerine, etc., will greatly reduce the mutual solubility of this medium and the solvent.

The stripping electrolyte which is injected into the extraction zone is preferably selected from the strong inorganic acids, preferably oxy acids, or inorganic bases such as HCl, HBr, $H_2SO_4$, $H_3PO_4$, $HNO_3$, NaOH, KOH, $Ca(OH)_2$, etc. It is often desirable to use it in solution of a suitable vehicle or solvent which should be miscible with the ionizing medium. The ionizing medium itself may be used as a vehicle for this purpose. Aqueous solutions are in general preferred.

The choice of buffer substance depends, as explained before, on the pH range which it is necessary to maintain in the extraction and scrubbing zones. This range is a function primarily of the composition of the feed. By way of example, some typical feed mixtures and buffers which can be used in conjunction therewith are listed below:

| Feed Mixture | Buffers |
|---|---|
| Phenol-thiophenol | NaOH, KOH. |
| Penicillin-fatty acids | Trisodium citrate, $Na_2HPO_4$. |
| Petroleum bases | Sodium bisulfate, phosphoric acid. |

When using strongly basic buffers such as NaOH, KOH in the separation of very weak acids, the salts formed between these acids and the strong base are in reality the buffers. The same holds true when using strong acids in the separation of weak bases. This phenomenon may be referred to as self-buffering. Buffers must be soluble in the ionizing medium and have a low distribution constant between the solvent and the ionizing medium, i. e., substantially below 1 and preferably below .1, so as to be dissolved predominantly in the ionizing medium.

The mixture of A and B to be separated may be fed to the extraction zone in solution of an inert vehicle which should be miscible with the ionizing medium or with the solvent or both. If desired, the ionizing medium may serve as the vehicle in which the feed is admitted. The feed acids or bases may, if desired, be in the form of their salts.

As indicated, the ionizing medium is introduced into the extraction zone at a point some distance away from the solvent inlet to enable the two liquids to flow countercurrently against each other. Thus it may be admitted at the end of this zone opposite the solvent inlet either as a separate stream, or in combination with the feed. Or it may be admitted at an intermediate point, if desired, in combination with the stripping electrolyte. Several or all of these points of introduction may be employed simultaneously.

In order to explain this invention more fully, be it assumed that A and B are organic acids, that A, the stronger acid, has a lower distribution constant K than the weaker acid B, that water is used as the ionizing medium, and that the solvent extract phase is scrubbed with water containing a buffering salt, for example, the sodium salt of a weak acid such as sodium phosphate. As the solvent and water flow countercurrently to each other, a separation of A and B occurs, A the stronger acid preferentially forming the sodium salt and being dissolved in water, and B preferentially going into the solvent. However, the separation is not complete, since varying proportions of B will also form the salt which dissolves in the water; and vice versa varying proportions of the free acid A will be taken up by the solvent. To improve the degree of separation, the component B must therefore be driven out of the aqueous solution, and this is accomplished by the addition of a stripping acid stronger than B at a point between the feed inlet and the aqueous raffinate outlet.

Figure 1:
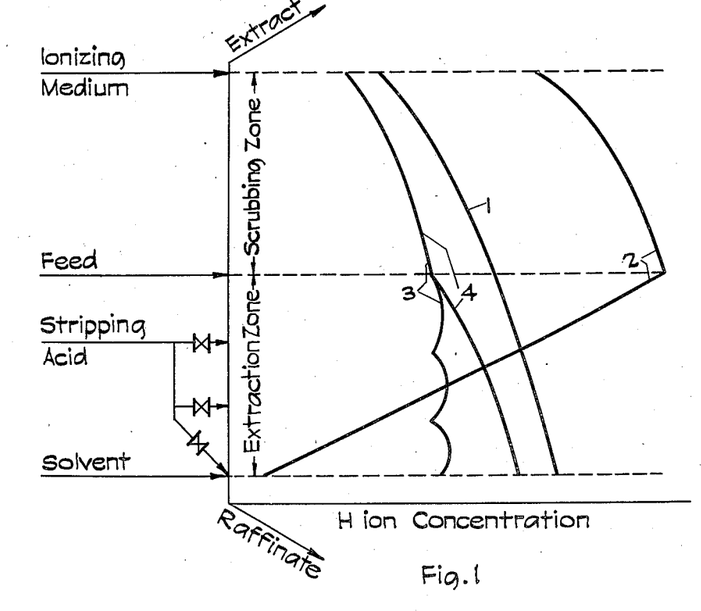
Figure 1 is a graph showing the hydrogen ion concentration at various points in a countercurrent extraction zone when applied to the separation of a mixture of organic acids, three different operating conditions being illustrated.

The underlying principle of this invention will be more readily understood by considering Figure 1 of the drawing, which represents a graph of a coordinate system, wherein the ordinate represents the length of a countercurrent extraction column having separate extraction and scrubbing zones, and the abscissae represents the hydrogen ion concentration (log. H ion) of the ionizing (aqueous raffinate) phase in equilibrium with the solvent extract phase when a mixture of organic acids A and B is treated. On the ordinate are also indicated the points of entry and withdrawal of the several streams, i. e. water (the ionizing medium) entering at the top, solvent (assumed to be lighter than water) at the bottom, feed in the middle; and solvent extract and aqueous raffinate phases emerging from top and bottom, respectively. The zone below the feed inlet is the solvent extraction zone and that above the feed is the scrubbing zone.

The ideal hydrogen ion gradient in this system for maximum selectivity between A and B would be one in which the hydrogen ion concentration in the ionizing medium is lowest at the top to reject from the solvent extract most if not all of the stronger acid A, and highest at the bottom to reject from the aqueous raffinate most if not all of the weaker acid B. Thus, the ideal gradient between the two ends should be continuous and unbroken, for example as the type indicated by curve 1.

However, the actual H ion gradient in the ordinary countercurrent extraction without the use of stripping agents is quite different from this ideal. It is at a minimum at the top, reaches a maximum at the feed inlet, and then decreases again towards the bottom end, as indicated by curve 2.

The reason for this naturally occurring, unfavorable gradient is as follows: In the scrubbing zone, the water, containing a buffer, as for example $Na_2HPO_4$, flows countercurrently against the solvent extract phase. At the inlet point of the water there tends to be established an equilibrium between the water and solvent extract phase at the hydrogen ion concentration corresponding to this equilibrium. Since the organic acid contained in the solvent extract at this point is predominantly the weaker acid B, this hydrogen ion concentration will be relatively low. A portion of B is transferred to the water either in the form of its salt or its ions. As the water containing B flows downward against the ascending solvent extract phase, weak acid B is exchanged for stronger acid A resulting in a gradual increase in hydrogen ion concentration (i. e. a gradual decrease in the pH) in the direction of flow of the water down to the feed inlet.

Below the feed inlet, however, a reversal in the gradient takes place, owing to a gradual extraction of organic acids from the aqueous phase by fresh solvent rising from below. This has the effect of reducing the acid concentration in the direction of the flow of the water, thereby reducing the hydrogen ion concentration.

The naturally occurring resulting hydrogen ion gradient in the extraction zone is indeed very unfavorable. However, it can be at least partially remedied by introducing into the extraction zone at one or several points below the feed inlet a stripping agent, e. g., water-soluble acid which has a low distribution coefficient into the solvent and which is stronger than B. This acid strips B from the aqueous phase. By properly controlling the amounts of the injected stripping acid and the location of injection, hydrogen ion gradients can be obtained as illustrated by curves 3 or 4, i. e., reversed from that which is natural.

While the above drawing illustrates the hydrogen ion gradient resulting from the separation of acids from one another, it is understood that the same principles apply to the separation of organic bases. However, all pH gradients are reversed from those shown in the drawing.

As in every solvent extraction, the fundamental property which controls the effectiveness of the separation of two components, A and B, is their alpha value, i. e., the ratio of their distribution coefficients K between the two phases at various points of the extraction zone. Alpha is defined as:

$$\frac{\text{Concentration of B in the Extract Phase}}{\text{Concentration of B in the Raffinate Phase}} : \frac{\text{Concentration of A in the Extract Phase}}{\text{Concentration of A in the Raffinate Phase}}$$

In many extraction systems, this coefficient remains substantially constant throughout the extraction zone. However, in the separation of acids or bases as herein contemplated, this alpha value is a function of the pH, and as the pH changes, the distribution coefficient may also change. As long as the alpha value remains greater (or smaller) than 1 throughout the extraction zone, the separation can always be achieved. However, if it goes from greater than 1 to smaller than 1 or vice versa, i. e., if a reversal of the alpha value occurs within the extraction zone, a separation will become impossible. This is analogous to the formation of an azeotrope in distillation. If this should happen, a different combination of solvents and ionizing media must be selected which will not result in such a reversal in the alpha value. It is always possible to find a suitable pair of liquids which, within the pH limits imposed by a given feed, will provide alpha value remaining on the same side of unity.

The exact amount of the stripping electrolyte introduced into the extraction zone for the purpose of modifying the pH gradient, as well as the amount of buffering capacity in this zone, are complicated functions of (1) the composition of the feed, (2) the strength of the acids in the feed, (3) the solvent power of the solvent and its selectivity for the components A and B of feed mixture, and (4) the solvent and ionizing properties of the ionizing medium. Even a very small amount of the stripping electrolyte will be of some benefit. However, the amount used should not be so large as to cause substantially all of the feed to be pushed into the solvent.

Solvent-to-feed ratios may vary between conventional limits which as a rule are between about 1:20 and 20:1, depending on a variety of factors. Likewise, temperatures and pressures are conventional, unless special properties, such as instability of bases or acids to be separated, impose special limitations. For example, in the separation of penicillin, temperatures as close to 0° C. as possible should be maintained to avoid deactivation of this unstable drug.

The apparatus used in the treatment may consist of a single column having bubble trays, packing or other contact means, and the necessary feed and exit lines; or it may comprise a series of mixers and settlers.

Figure 2:
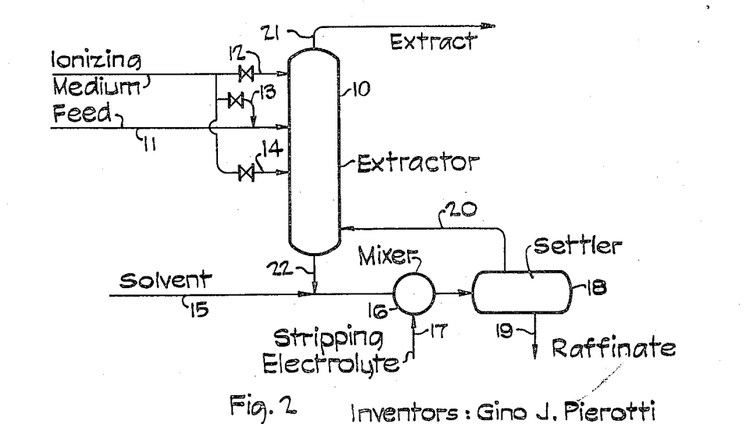
Figure 2 is a schematic flow diagram illustrating one specific application of the invention.

In Figure 2 of the drawing, an apparatus is shown embodying a preferred method of operation. A feed mixture containing components A and B as hereinbefore described, enters extractor 10 through line 11 at some point intermediate its ends. Ionizing medium is admitted through any one or several of lines 12, 13 and 14. As may be seen, if line 12 were closed, the extractor would operate without a scrubbing zone, and the invention can be produced in that manner.

Solvent from line 15 flows together with an intermediate raffinate phase withdrawn via line 22 from the bottom of the extractor 10 into mixer 16. Stripping electrolyte is admitted through line 17 to the mixer, wherein all three components are thoroughly mixed. The resulting mixture is transferred to settler 18. Final raffinate phase is withdrawn from its bottom through line 19, and solvent extract phase goes through top line 20 into extractor 10 where it rises countercurrently against the descending raffinate phase containing ionizing medium. The final scrubbed solvent extract phase is withdrawn from the top of the extractor 10 through line 21. In the usual case in which the alpha value is greater than 1, the stronger component A is concentrated in raffinate and the weaker component B in the extract. When the alpha value is less than 1, the stronger component A is concentrated in the extract and the weaker component B is concentrated in the raffinate.

The following examples further illustrate the invention.

EXAMPLE I

An aqueous solution of penicillin is contaminated with weaker acids normally associated therewith and originating in a fermentation culture. This solution has a pH of 7. It is extracted with 100% by volume of methylisobutyl ketone in two theoretical countercurrent stages to recover 98% of the penicillin in the aqueous raffinate phase, while rejecting as much as possible of the weaker acids in the methylisobutyl ketone extract phase. To achieve this, stripping acid must be introduced at some point of the extraction system. Three cases have been tested.

*Case 1.*—Where all of the required stripping acid is injected as part of the feed.

*Case 2.*—Where the required amount of the stripping acid is injected at a number of points between the feed inlet and raffinate outlet.

*Case 3.*—Where all of the stripping acid is injected near the solvent inlet.

Case 1: The entire amount of acid required to get the 98% penicillin recovery in the raffinate phase is admixed with the ingoing feed. This results in aqueous phases having a pH at the feed inlet of 4.32 and at the raffinate outlet of 8.15. 39% of the acids weaker than penicillin are rejected from the raffinate phase.

Case 2: The required amount of stripping acid is so distributed as to result in a substantially constant pH of 6.25 in the aqueous phases throughout the extraction zone. Penicillin recovery in the aqueous raffinate phase is 98%, and weak acid rejection is 53%.

Case 3: The required amount of stripping acid is injected at the level where the solvent extract phase has a composition equivalent to equilibrium with the raffinate phase outlet. This results in a pH in the aqueous phase at the feed inlet of 7.0 and of 5.9 at the raffinate outlet. The penicillin recovery in the raffinate phase is 98% and weak acid rejection is 60%.

It is evident that the gradient of the hydrogen ions is, in Case 1, similar to the natural gradient represented by the part of curve 2 of Figure 1 which is below the level of the feed inlet. The gradient is more favorable in the latter two cases, being representable in Case 2 by a generally vertical line, such as the lower part of curve 3 and, in Case 3, by a curve such as the lower part of curve 4. In Cases 2 and 3 penicillin of greatly improved purity is recovered with the same yield.

EXAMPLE II

Three samples of aqueous solutions of penicillin containing both weaker and stronger acids produced in the fermentation were separately extracted in an extraction column with equal volumes of methylisobutyl ketone. The aqueous penicillin solution was introduced near the top of the column; the solvent was introduced near the bottom of the column. Dilute aqueous $H_2SO_4$ was introduced in a different manner in the extraction of each sample as follows:

*Case 1.*—The acid was injected with the aqueous penicillin solution feed.

*Case 2.*—The acid was injected with the feed which was lightly buffered in order to produce a constant pH throughout the column.

*Case 3.*—The acid was injected between the feed and solvent inlets.

The resulting solvent extract phase containing acids weaker than penicillin was withdrawn from the top of the column and the resulting aqueous raffinate phase containing the penicillin and stronger acids was withdrawn from the bottom of the column. The aqueous phases were then separately acidified, solvent extracted, and water-washed to remove acids stronger than penicillin, dried and tested for purity. The results were as follows:

*Table I*

| Case No. | pH of Aqueous Phase | | Per Cent Recovery of Penicillin | Purity of Penicillin in Oxford Units, mg.[1] |
|---|---|---|---|---|
| | Inlet | Outlet | | |
| 1 | 5.2 | 6.75 | 90 | 392 |
| 2 | 5.2 | 5.2 | 91 | 530 |
| 3 | 6.8 | 4.5±.2 | 97 | 580 |

[1] See article by Florey and Jennings in British Journal of Experimental Pathology, vol. 23, p. 120, June, 1942.

EXAMPLE III

An equi-molecular mixture of chloroacetic acid and propionic acid was extracted in two different runs, both carried out at 25° C. and at atmospheric pressure in five countercurrent stages comprising mixers and settlers as follows: The feed mixture of the organic acids was dissolved in water (used as the ionizing medium) containing minor amounts of other acids and bases in such quantity that the resulting solution contained 0.0985 mole of each organic acid per liter and had a pH of 5.0. This solution was continuously admitted to the fifth stage. Methylisobutyl ketone (used as the organic extraction solvent) was admitted continuously into the first stage in the same volumetric flow rate as the water and flowed countercurrently to the water. Aqueous raffinate phase was continuously withdrawn from the first stage and solvent extract phase was continuously withdrawn from the fifth stage. These runs differed as follows:

*Run 1.*—No further injection of inorganic acid was used.

*Run 2.*—Aqueous HCl was admitted as a stripping agent into the first stage in amount to lower the pH of the aqueous phase therein to 3.5.

The conditions within the extraction stages and the compositions of the raffinate and extract were as follows:

*Table II*

| Run No. | pH of Aqueous Phase | | | | | Recovery in Raffinate Phase | | Recovery in Solvent Extract Phase | |
|---|---|---|---|---|---|---|---|---|---|
| | Stage 1 | Stage 2 | Stage 3 | Stage 4 | Stage 5 | A | B | A | B |
| | | | | | | Per cent | Per cent | Per cent | Per cent |
| 1 | 5.75 | 5.6 | 5.4 | 5.25 | 5.0 | 99.5 | 41.0 | 0.5 | 59.0 |
| 2 | 3.5 | 4.35 | 4.85 | 4.95 | 5.0 | 99.3 | 20.5 | 0.7 | 79.5 |

NOTE: A is chloroacetic acid (the stronger acid); B is propionic acid (the weaker acid).

These data demonstrate the advantage of injecting a stripping electrolyte (run 2) over ordinary extraction. The recovery data show that the purity of the chloroacetic acid recovered in the raffinate phase was increased from 70.9 to 82.8 moles per cent with about the same yield, and that the yield of propionic acid recovered in the solvent extract phase was increased from 59 to 79.5 percent with about the same purity.

EXAMPLE IV

As a further example of the separation of organic acids, an equimolecular mixture of p-hydroxybenzoic acid and o-hydroxybenzoic acid, is extracted in two different runs as described for Example III, with the difference that the feed mixture is dissolved in water containing minor amounts of inorganic acids and bases to result in an aqueous solution containing 0.050 mole of each acid per liter. Stripping electrolyte (aq. HCl) is injected into the first stage in run 2 only to lower the pH in that stage to 5.0. The conditions in the extraction stages and the results are as follows:

*Table III*

| Run No. | pH of Aqueous Phase | | | | | Recovery in Raffinate Phase | | Recovery in Solvent Extract Phase | |
|---|---|---|---|---|---|---|---|---|---|
| | Stage 1 | Stage 2 | Stage 3 | Stage 4 | Stage 5 | A | B | A | B |
| | | | | | | Per cent | Per cent | Per cent | Per cent |
| 1 | 7.80 | 7.35 | 6.90 | 6.45 | 6.0 | 86.4 | 43.0 | 13.6 | 57.0 |
| 2 | 5.0 | 5.25 | 5.55 | 5.75 | 6.0 | 80.0 | 0.5 | 20.0 | 99.5 |

NOTE: A is o-hydroxybenzoic acid (the stronger acid); B is p-hydroxybenzoic acid (the weaker acid).

The improved concentration of o-hydroxybenzoic acid in the raffinate phase and of p-hydroxybenzoic acid in the solvent extract phase are evident.

EXAMPLE V

To demonstrate the effect of multi-point injection and the use of a scrubbing zone, an equimolecular mixture of benzoic acid and o-hydroxybenzoic acid is extracted in different runs by dissolving the mixture in water (used as the ionizing medium) containing minor amounts of other inorganic acids and bases in such quantity that the resulting solution contains 0.050 mole of each acid per liter and had a pH of 5.0. This solution is admitted into the third stage of a three-stage countercurrent extractor, and contacted countercurrently with an equal volume of methyl isobutyl ketone (used as the organic extraction solvent) which is admitted into the first stage. Aqueous raffinate phase is continuously withdrawn from the first stage, and solvent extract phase is withdrawn from the third stage. No scrubbing zone was used in runs 1 and 2. In run 3 two scrubbing stages, identified as stages 4 and 5, are used, and the solvent extract phase from the third stage is introduced into the fourth stage and contacted countercurrently with water admitted to the fifth stage at a volumetric rate equal to twice the water fed to the third stage and conaining NaOH in amount sufficient to raise the pH of the water in the fifth stage to 6.0. Scrubbing water from the fourth stage is transferred to the third stage and therein combined with the water containing the feed mixture.

No acid is injected in run 1. In run 2 aqueous HCl is injected as stripping electrolyte into the first and second stages in an amount to maintain the pH of the aqueous phase in all stages at 6.0. In run 3 aqueous HCl is injected into the first stage to lower the pH therein to 5.0. The conditions within the extraction stages and the compositions of the raffinate and extract are as follows (the composition of the extract reported for run 3 is that of the water-scrubbed extract from the fifth stage):

Table IV

| Run No. | pH of Aqueous Phase | | | | | Recovery in Raffinate Phase | | Recovery in Solvent Extract Phase | |
|---|---|---|---|---|---|---|---|---|---|
| | Stage 1 | Stage 2 | Stage 3 | Stage 4 | Stage 5 | A | B | A | B |
| | | | | | | Per cent | Per cent | Per cent | Per cent |
| 1 | 7.6 | 7.55 | 6.95 | | | 99.3 | 92.8 | 0.72 | 7.2 |
| 2 | 6.0 | 6.0 | 6.0 | | | 85.0 | 16.9 | 15.0 | 83.1 |
| 3 | 5.0 | 5.7 | 5.7 | 5.48 | 6.0 | 92.3 | 22.9 | 7.7 | 77.1 |

NOTE: A is o-hydroxybenzoic acid (the stronger acid); B is benzoic acid (the weaker acid).

These data show improved separations in the cases of runs 2 and 3, wherein a stripping electrolyte is injected. Purities of o-hydroxybenzoic acid in the raffinate for the three runs are 51.7, 83.4 and 80 mole percent, respectively, and of the benzoic acid in the corresponding extract were 91.0, 84.7 and 90.8 mole percent.

EXAMPLE VI

To demonstrate the application of the process to the separation of organic bases, a mixture of pyridine and methylcyclohexylamine is extracted in several runs in the manner described in Example III, with the difference that the mole ratio of pyridine to methylcyclohexylamine in the feed is 1.04 to 1 in runs 1 and 2, and the feed mixture is dissolved in water containing minor amounts of other inorganic acids and bases to result in a solution containing 0.0520 mole of pyridine and 0.0500 mole of methylcyclohexylamine per liter and having a pH of 6.0. Runs 3 and 4 are presented to demonstrate the effect of operating at a constant pH; therein an equimolecular mixture of the same bases is treated, being dissolved in water to produce a solution containing 0.0500 mole of each organic base per liter and a pH of 9.0, and the resulting solution is fed into the third stage of a three-stage countercurrent extraction zone.

No stripping electrolyte is used in runs 1 and 3; in runs 2 aqueous NaOH is injected into the first stage in quantity to raise the pH of the aqueous phase therein to 10.0, and in run 4 NaOH is injected into the first and second stages to maintain a constant pH of 9.0. The conditions and the results are:

Table V

| Run No. | pH of Aqueous Phase | | | | | Recovery in Raffinate Phase | | Recovery in Solvent Extract Phase | |
|---|---|---|---|---|---|---|---|---|---|
| | Stage 1 | Stage 2 | Stage 3 | Stage 4 | Stage 5 | A | B | A | B |
| | | | | | | Per cent | Per cent | Per cent | Per cent |
| 1 | 3.8 | 4.25 | 4.7 | 5.2 | 5.6 | >99 | 25.2 | <1.0 | 74.8 |
| 2 | 10.0 | 9.7 | 9.4 | 7.4 | 5.9 | >99 | 1.6 | <1.0 | 98.4 |
| 3 | 7.0 | 8.0 | 9.0 | | | 89.0 | 4.0 | 11.0 | 96.0 |
| 4 | 9.0 | 9.0 | 9.0 | | | 89.3 | 3.8 | 10.7 | 96.2 |

NOTE: A is methylcyclohexylamine (the stronger base); B is pyridine (the weaker base).

Comparing runs 1 and 2, the advantage of adding NaOH as a stripping electrolyte is evident from the increased purity with which methylcyclohexylamine is concentrated in the raffinate, and from the increased yield of pyridine in the extract. These runs further show that the pH can be on the acid side in certain stages when extracting bases. Comparing runs 3 and 4, which are at higher pH values wherein already a very effective separation is effected in three stages by ordinary extraction without using a stripping electrolyte, it will be noted that a still further improvement both in the purities and yields of the products are obtained.

EXAMPLE VII

As a further example of the separation of organic bases, an equimolecular mixture of aniline and methylcyclohexylamine is extracted in the manner previously described, with the difference that only two countercurrent stages are used. The feed mixture is dissolved in the water to produce an aqueous solution containing 0.050 mole of each base per liter and the resulting solution is fed into the second stage, methyl isobutyl ketone being fed into the first stage. Stripping electrolyte (aq. NaOH) is injected into the first stage only in run 2 to raise the pH to 5.2. The conditions and results are as follows:

Table VI

| Run No. | pH of Aqueous Phase | | Recovery in Raffinate Phase | | Recovery in Solvent Extract Phase | |
|---|---|---|---|---|---|---|
| | Stage 1 | Stage 2 | A | B | A | B |
| | | | Per cent | Per cent | Per cent | Per cent |
| 1 | 3.5 | 5.0 | 100 | 2.4 | 0.0 | 97.6 |
| 2 | 5.2 | 5.0 | 100 | 0.3 | 0.0 | 99.7 |

NOTE: A is methylcyclohexylamine (the stronger base); B is aniline (the weaker base).

These results show that improved separation is effected by injecting a stripping electrolyte even in a system where a fairly complete separation can be effected by ordinary extraction in only two stages.

This application is a continuation-in-part of our copending application Serial No. 540,923, filed June 19, 1944, which was subsequently abandoned.

We claim as our invention:

1. Process for separating a mixture of organic electrolytes having a tendency to change their number of protons in the same direction when dissolved in an ionizing medium therefor which is a highly polar, substantially water-miscible liquid, said electrolytes having different dissociation constants, into fractions containing said electrolytes in different proportions comprising the steps of introducing said mixture into an extraction zone; countercurrently contacting said mixture in said extraction zone in the presence of said ionizing medium with an organic, at least partially water-immiscible solvent for said organic electrolytes which is at least partially immiscible with said ionizing medium to produce a raffinate phase rich in the ionizing medium and a solvent extract phase rich in the organic solvent; separating said phases and withdrawing them from the extraction zone; and introducing into said extraction zone at one or more points downstream in the direction of flow of the raffinate phase from the point of introduction of the said mixture a stripping electrolyte, having the same tendency as said organic electrolytes to change protons when dissolved in said ionizing medium and having a higher dissociation constant then the least ionized of said organic electrolytes and having a distribution constant between said organic solvent and the ionizing medium less than 1.

2. The process according to claim 1 wherein said ionizing medium is water.

3. Process according to claim 1 wherein the organic electrolytes are organic acids.

4. Process according to claim 1 wherein the organic electrolytes are organic bases.

5. Process for separating a mixture of organic electrolytes having a tendency to change their number of protons in the same direction when dissolved in water, said electrolytes having different dissociation constants, into fractions containing said electrolytes in different proportions comprising the steps of introducing said mixture into an extraction zone; countercurrently contacting said mixture in said extraction zone in the presence of water with an organic, at least partially water-immiscible solvent for said organic electrolytes to produce an aqueous raffinate phase and a solvent extract phase rich in the organic solvent; separating said phases and withdrawing them from the extraction zone; and introducing into said extraction zone at one or more points downstream in the direction of flow of the raffinate phase from the point of introduction of the said mixture an inorganic water-soluble stripping electrolyte having the same tendency as said organic electrolytes to change protons as said mixture when dissolved in water and having a higher dissociation constant than the least ionized of said organic electrolytes.

6. In a process for separating a mixture of organic electrolytes each of which is ionizable when dissolved in an ionizing medium therefor into a conjugated acid-base pair represented by A for the acid form and by B for the base form, different members of the mixture having different ionization constants, by solvent extraction into fractions containing said electrolytes in different proportions, the improvement comprising introducing the mixture into an extraction zone and contacting it therein with two partially mutually immiscible extraction liquids flowing countercurrently one to the other, one of said liquids being an organic, substantially water-immiscible solvent for said electrolytes in un-ionized form and the other of said liquids being a substantially water-miscible ionizing medium having an effective buffer pH range within the range of the pK values covered by said organic substances to produce a raffinate phase rich in the ionizing medium and a solvent extract phase rich in the organic solvent; introducing into said extraction zone an inorganic stripping electrolyte which is soluble and ionizable in said ionizing medium into a conjugated acid-base pair and which has an ionization constant greater than that of the least ionized of said organic electrolytes; and separately withdrawing from opposite ends of said extraction zone a solvent extract phase containing a portion of said mixture and a raffinate phase containing another portion of said mixture; said inorganic stripping electrolyte being introduced into the extraction zone in at least one region thereof between the mixture inlet and the raffinate phase outlet.

7. The process according to claim 6 wherein the inorganic stripping electrolyte is introduced into the extraction zone at a point near the point of withdrawal of the raffinate phase.

8. Process for separating a mixture of organic electrolytes having a tendency to change their number of protons in the same direction when dissolved in water, said electrolytes having different dissociation constants, into fractions containing said electrolytes in different proportions comprising the steps of introducing the mixture into an extraction zone and contacting it therein with water and an organic, at least partially water-immiscible solvent for said organic electrolytes in the un-ionized form, said water and organic solvent flowing countercurrently one to the other, to produce an aqueous raffinate phase and a solvent extract phase rich in the organic solvent; separately withdrawing raffinate and solvent extract phases containing different portions of said mixture substantially from opposite ends of said extraction zone; and introducing into said extraction zone at least in one region thereof near the intake of said organic solvent an inorganic stripping electrolyte which has the same tendency as said organic electrolytes to change protons when dissolved in water and has a stronger ionization constant than the least ionized of said organic electrolytes.

9. Process according to claim 8 wherein the water contains an acid-base buffer having an effective pH range within the range of the pK values covered by said organic electrolytes.

10. Process according to claim 8 wherein the stripping electrolyte is introduced into said extraction zone at a plurality of regions thereof between the mixture inlet and the intake of said organic solvent.

11. In a process for separating a mixture of organic acids, different members of the mixture having different ionization constants, by solvent extraction into fractions containing said acids in different proportions, the improvement comprising introducing the mixture into an extraction zone and contacting it therein with water and an organic, partially water-immiscible extraction solvent flowing countercurrently one to the other, said organic extraction solvent being a solvent for said organic acids in un-ionized form; introducing an inorganic acid which had an ionization constant greater than that of the least-ionized of said organic acids into said extraction zone; and separately withdrawing substantially at the opposite ends of said extraction zone a solvent extract phase which is rich in said organic solvent and contains a portion of said mixture, and an aqueous raffinate phase containing another portion of said mixture; said inorganic acid being introduced into the extraction zone in at least one region thereof between the mixture inlet and the aqueous raffinate phase outlet.

12. The process according to claim 11 wherein the inorganic acid is admitted in sufficient amount to maintain in the aqueous raffinate phase near the outlet thereof a hydrogen ion concentration at least as high as the hydrogen ion concentration in the aqueous raffinate phase at the mixture inlet.

13. The process according to claim 12 wherein the hydrogen ion concentration in the aqueous raffinate phase near the outlet thereof is maintained higher than the hydrogen ion concentration in the aqueous raffinate phase at the mixture inlet.

14. In a process for separating a mixture of organic acids, different members of the mixture having different ionization constants, by solvent extraction into fractions containing said acids in different proportions, the improvement comprising introducing the mixture into an extraction zone and contacting it therein with water and an organic, partially water-immiscible solvent flowing countercurrently one to the other, said organic solvent being a solvent for said acids in un-ionized form, separately withdrawing substantially at the opposite ends of the extraction zone a solvent extract phase containing a portion of said mixture and an aqueous raffinate phase containing the remainder of said mixture, and introducing an inorganic acid which has an ionization constant greater than that of the least-ionized of said acids at a plurality of points between the mixture inlet and the point of withdrawal of the aqueous raffinate phase in sufficient quantity to maintain in the aqueous raffinate phase a hydrogen ion concentration which is, throughout substantially all parts of the extraction zone between said mixture inlet and said point of withdrawal of the aqueous raffinate, at least as high as at said mixture inlet.

15. In a process for separating a mixture of organic bases, different members of the mixture having different ionization constants, by solvent extraction into fractions containing said bases in different proportions, the improvement comprising introducing the mixture into an extraction zone and contacting it therein with water and an organic, partially water-immiscible extraction solvent flowing countercurrently one to the other, said extraction solvent being a solvent for said organic bases in un-ionized form; introducing an inorganic base which has an ionization constant greater than that of the least-ionized of said organic bases into said extraction zone; and separately withdrawing substantially at the opposite ends of said extraction zone a solvent extract phase which is rich in said organic solvent and contains a portion of said mixture, and an aqueous raffinate phase containing another portion of said mixture, said inorganic base being introduced into the extraction zone in at least one region thereof between the mixture inlet and the aqueous raffinate phase outlet.

16. The process according to claim 15 wherein the inorganic base is admitted in sufficient amount to maintain in the aqueous raffinate phase near the outlet thereof a hydrogen ion concentration not higher than the hydrogen ion concentration in the aqueous raffinate phase at the mixture inlet.

17. The process according to claim 16 wherein the hydrogen ion concentration in the aqueous raffinate phase near the outlet thereof is maintained lower than the hydrogen ion concentration in the aqueous raffinate phase at the mixture inlet.

18. In a process for separating a mixture of organic bases, different members of the mixture having different ionization constants, by solvent extraction into fractions containing said bases in different proportions, the improvement comprising introducing the mixture into an extraction zone and contacting it therein with water and an organic, partially water-immiscible solvent flowing countercurrently one to the other, said organic solvent being a solvent for said bases in un-ionized form, separately withdrawing substantially at the opposite ends of the extraction zone a solvent extract phase containing a portion of said mixture and an aqueous raffinate phase containing the remainder of said mixture, and introducing an inorganic base which has an ionization constant greater than that of the least-ionized of said bases at a plurality of points between the mixture inlet and the point of withdrawal of the aqueous raffinate phase in sufficient quantity to maintain in the aqueous raffinate phase a hydrogen ion concentration which is, throughout substantially all parts of the extraction zone between said mixture inlet and said point of withdrawal of the aqueous raffinate, not higher than at said mixture inlet.

19. Process for separating a mixture of organic electrolytes having a tendency to change their number of electrons in the same direction when dissolved in an ionizing medium therefor, which is a highly polar, substantially water-miscible liquid, said electrolytes having different dissociation constants, into fractions containing said electrolytes in different proportions comprising the steps of introducing said mixture into an extraction zone and contacting it therein with two partially mutually immiscible liquids flowing countercurrently one to the other; one of said liquids being an organic, substantially water-immiscible solvent for said electrolytes in their un-ionized form and the other of said liquids being the said ionizing medium, to produce a raffinate phase rich in the ionizing medium and a solvent extract phase rich in the organic solvent; introducing into said extraction zone an inorganic stripping electrolyte which is soluble in said ionizing medium and has the same tendency as said organic electrolytes to change protons when dissolved in said ionizing medium and having a dissociation constant greater than that of the least ionized of said organic electrolytes; separately withdrawing substantially from opposite ends of said extraction zone a solvent extract phase containing a portion of said mixture and a raffinate phase containing another portion of said mixture; said inorganic stripping electrolyte being introduced into the extraction in at least one region thereof between the mixture inlet and the intake of the organic solvent in sufficient quantity to maintain a progressive gradient in the hydrogen ion concentration in the said raffinate phase throughout at least a portion of the extraction zone in the direction of flow of the ionizing medium.

20. Process according to claim 19 wherein the ionizing medium is water.

21. Process for separating a mixture of organic electrolytes having a tendency to change their number of protons in the same direction when dissolved in an ionizing medium therefor, which is a highly polar, substantially water-miscible liquid, said electrolytes having different dissociation constants, into fractions containing said electrolytes in different proportions comprising the steps of introducing said mixture into an extraction zone and contacting it therein with two partially mutually immiscible extraction liquids flowing countercurrently one to the other, one of said liquids being an organic, substantially water-immiscible solvent for said electrolytes in un-ionized form and the other of said liquids being the said ionizing medium, to produce a raffinate phase rich in the ionizing medium and a solvent extract phase rich in the organic solvent; introducing into said extraction zone an inorganic stripping electrolyte which is soluble in said ionizing medium and has the same tendency as said organic electrolytes to change protons when dissolved in said ionizing medium and having a dissociation constant greater than that of the least ionized of said organic electrolytes; separately withdrawing substantially from opposite ends of said extraction zone a solvent extract phase containing a portion of said mixture and a raffinate phase containing another portion of said mixture; said inorganic stripping electrolyte being introduced into the extraction zone in at least one region thereof between the mixture inlet and the raffinate phase outlet; scrubbing said solvent extract phase with a fresh portion of said ionizing medium to form a second pair of liquid phases, one of which is an ionizing medium phase and the other of which is a scrubbed extract phase; separating the latter phases; and introducing the separated ionizing medium phase into said extraction zone.

22. Process for separating a mixture of organic electrolytes having a tendency to change their number of protons in the same direction when dissolved in water, said electrolytes having different dissociation constants, into fractions containing said electrolytes in different proportions comprising the steps of introducing said mixture into an extraction zone and contacting it therein with water and an organic, at least partially water-immiscible solvent for said organic electrolytes in the un-ionized form, said water and organic solvent flowing countercurrently one to the other, to produce an aqueous raffinate phase and a solvent extract phase rich in the organic solvent; separately withdrawing raffinate and solvent extract phases substantially from the ends of the extraction zone; admixing the withdrawn raffinate phase with fresh organic solvent and an inorganic stripping electrolyte which has the same tendency as said organic electrolytes to change protons when dissolved in water and having a higher dissociation constant than the least-ionized of organic electrolytes, thereby forming a final raffinate phase and a solvent-rich phase; separating the latter phases; and introducing the separated solvent-rich phase into said extraction zone and causing it to flow countercurrently to the ionizing medium therein, said inorganic stripping electrolyte having a distribution constant between said solvent and water less than 1.

23. In a process for separating penicillin from a mixture containing it and organic acid impurities normally associated therewith, the improvement comprising subjecting said mixture in an extraction zone to the action of water and a solvent for penicillin flowing countercurrently to the flow of said water through said extraction zone; introducing an inorganic acid into said extraction zone, thereby increasing the hydrogen ion concentration in the resulting aqueous raffinate phase in said extraction zone; and separately withdrawing an aqueous raffinate phase and a solvent extract phase from said extraction zone, said inorganic acid being introduced into said zone at a point between the mixture inlet and the aqueous raffinate outlet.

24. Process according to claim 23 wherein the inorganic acid is introduced into the extraction zone in sufficient amount to maintain an increasing hydrogen ion concentration in said resulting aqueous raffinate phase throughout at least a portion of the extraction zone in the direction of flow of said water.

25. In a process for separating penicillin from a mixture containing it and organic acid impurities normally associated therewith, the improvement comprising subjecting said mixture in an extraction zone to the action of water and a solvent for penicillin flowing countercurrently to the flow of said water through said extraction zone; introducing an inorganic acid into said extraction zone at a plurality of points thereof, thereby maintaining an increasing hydrogen ion concentration gradient in the resulting aqueous raffinate phase substantially throughout the extraction zone in the direction of flow of said water; and separately withdrawing an aqueous raffinate phase and a solvent extract phase from the extraction zone, said inorganic acid being introduced into said extraction zone at a plurality of points between said mixture inlet and the aqueous raffinate outlet.

GINO J. PIEROTTI.
FREDERIC A. FRENCH.
MOTT SOUDERS, JR.

REFERENCES CITED

The following references are of record in the file of this patent:

UNITED STATES PATENTS

| Number | Name | Date |
|---|---|---|
| 2,471,053 | Almquist et al. | May 24, 1949 |
| 2,488,878 | Petty | Nov. 22, 1949 |